(12) United States Patent
Duelm et al.

(10) Patent No.: US 10,190,428 B2
(45) Date of Patent: Jan. 29, 2019

(54) UNIVERSAL SEAL

(71) Applicant: United Technologies Corporation, Hartford, CT (US)

(72) Inventors: Bradley T. Duelm, Wethersfield, CT (US); Randall J. Brown, Hartford, CT (US); Nathan A. Shirk, Hartford, CT (US); Lewis M. Holby, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 648 days.

(21) Appl. No.: 14/735,530

(22) Filed: Jun. 10, 2015

(65) Prior Publication Data

US 2015/0315924 A1   Nov. 5, 2015

Related U.S. Application Data

(63) Continuation of application No. 13/221,285, filed on Aug. 30, 2011, now Pat. No. 9,115,591.

(51) Int. Cl.
*F01D 11/00* (2006.01)
*F16J 15/16* (2006.01)
*F16J 15/44* (2006.01)

(52) U.S. Cl.
CPC ............. *F01D 11/001* (2013.01); *F16J 15/16* (2013.01); *F16J 15/444* (2013.01); *F05D 2220/32* (2013.01); *F05D 2250/283* (2013.01); *Y10T 29/49297* (2015.01)

(58) Field of Classification Search
CPC .. F01D 11/001; F16J 15/444; F05D 2250/283
See application file for complete search history.

(56) References Cited

U.S. PATENT DOCUMENTS

| | | | |
|---|---|---|---|
| 3,603,599 A | 9/1971 | Laird et al. | |
| 5,228,195 A | 7/1993 | Brown et al. | |
| 6,503,051 B2 * | 1/2003 | Predmore | F01D 11/005 277/312 |
| 6,672,073 B2 * | 1/2004 | Wiebe | F23R 3/283 60/747 |
| 6,916,021 B2 | 7/2005 | Beeck et al. | |
| 7,066,719 B2 * | 6/2006 | Aguilar | F01D 11/003 277/419 |
| 7,334,983 B2 | 2/2008 | Aivanos et al. | |
| 9,115,591 B2 * | 8/2015 | Duelm | F01D 11/001 |
| 2004/0239040 A1 * | 12/2004 | Burdgick | F01D 11/001 277/414 |
| 2008/0260521 A1 * | 10/2008 | Werro | F01D 11/003 415/170.1 |
| 2009/0324395 A1 * | 12/2009 | Rose | B23P 6/005 415/173.7 |

* cited by examiner

*Primary Examiner* — David E Sosnowski
*Assistant Examiner* — Juan G Flores
(74) *Attorney, Agent, or Firm* — Carlson, Gaskey & Olds, P.C.

(57) ABSTRACT

A seal for a gas turbine engine includes a top, a bottom, a left side, a right side, a back and a front. The back is parallel to the front and the left side is parallel to the right side such that a non-square shape is formed by the intersection of the back, the left side, the front and the right side. The top includes a first vane mating surface and the bottom includes a second vane mating surface.

10 Claims, 4 Drawing Sheets

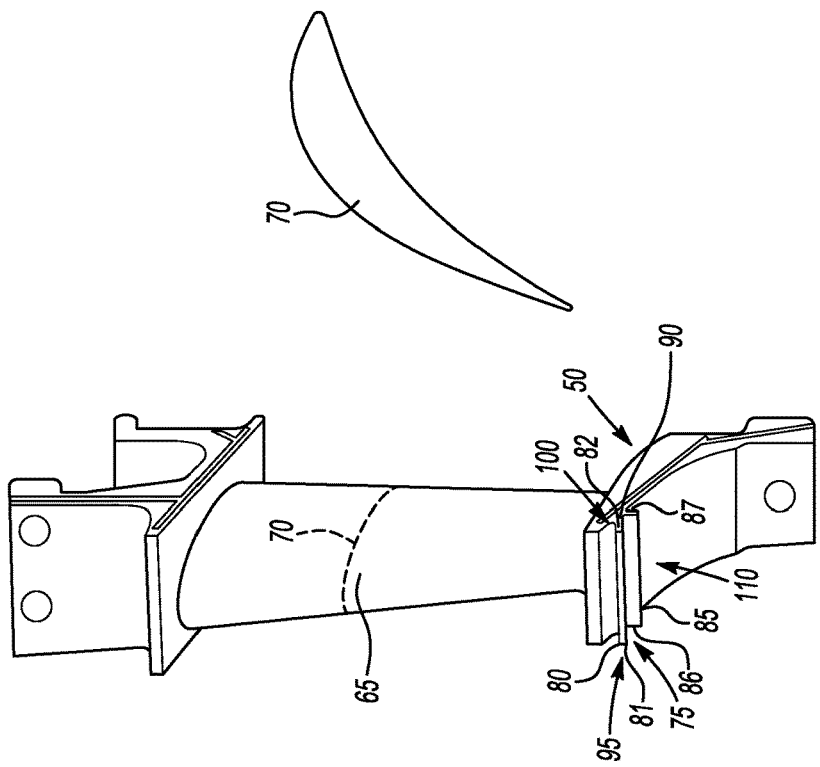
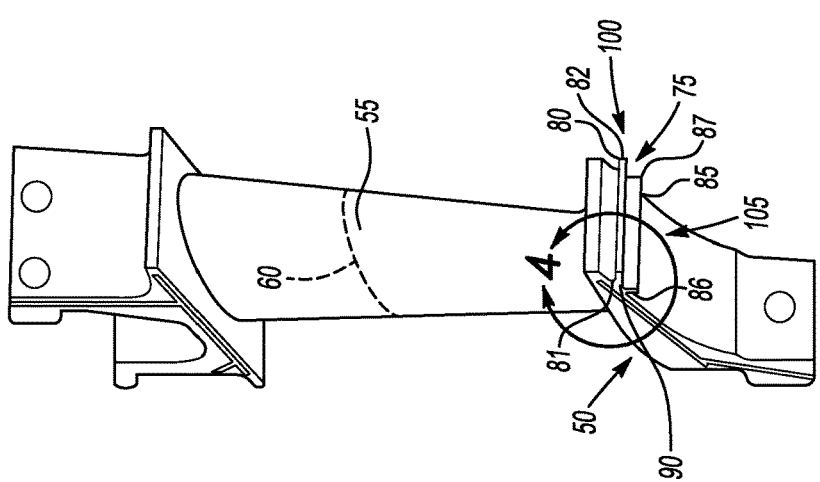
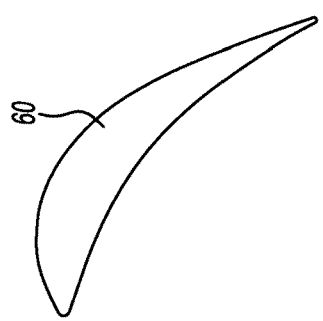

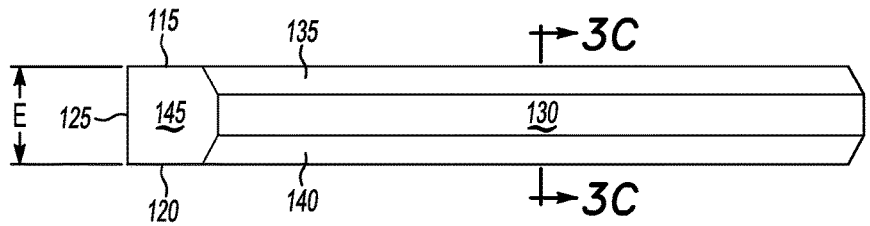
*Fig-3A*
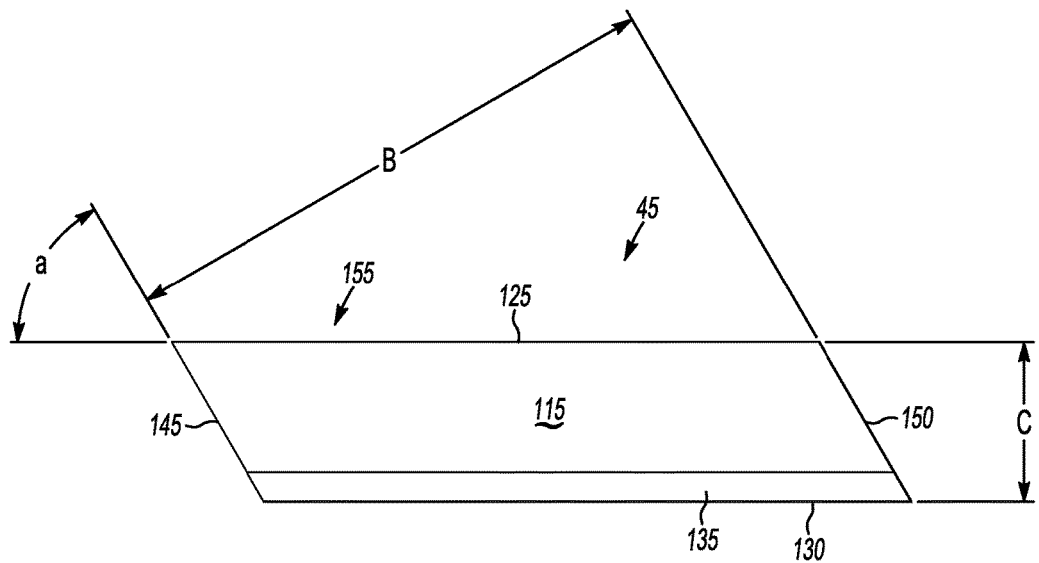
*Fig-3B*
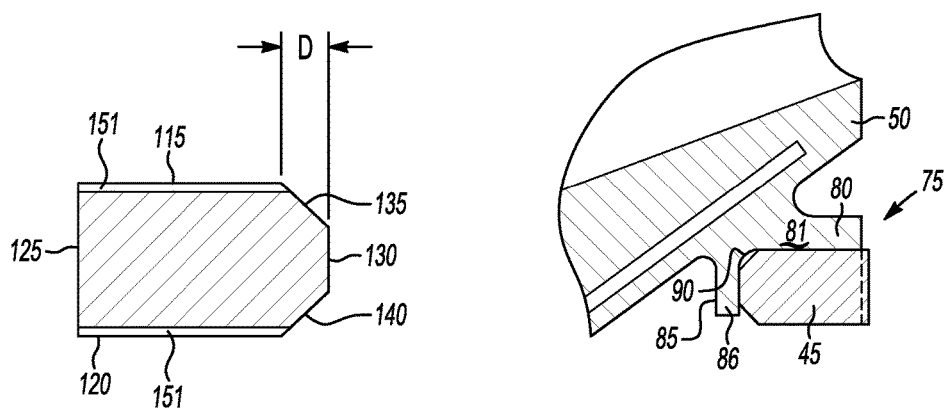
*Fig-3C*          *Fig-4*

UNIVERSAL SEAL

CROSS-REFERENCE TO RELATED APPLICATIONS

This disclosure is a continuation of U.S. patent application Ser. No. 13/221,285 filed Aug. 30, 2011.

BACKGROUND OF THE INVENTION

In gas turbine engines, the overall operating efficiency may be adversely affected by leakage of a working fluid around the tips or the bases of rotating airfoils. More specifically, in a compressor, leakage of the compressed fluid around the tips or roots of the airfoils may result in a loss of lift and may introduce viscous losses. This in turn reduces the pressure rise capability of the compressor and causes wasteful conversion of input mechanical energy into gas energy.

It is known to utilize a cellular shroud or honeycomb-type abradable seal construction over the vane tips or about its roots to stabilize the flow near the vane root or compressor casing or wall allowing a higher pressure rise before separation and/or desensitizing the performance of the compressor to inlet radial velocity profile changes near the cellular shroud or honeycomb seal.

SUMMARY OF THE INVENTION

In one exemplary embodiment, a seal for a gas turbine engine includes a top, a bottom, a left side, a right side, a back and a front. The back is parallel to the front and the left side is parallel to the right side such that a non-square shape is formed by the intersection of the back, the left side, the front and the right side. The top includes a first vane mating surface and the bottom includes a second vane mating surface.

In a further embodiment of any of the above, a first chamfer is defined between the top and the front.

In a further embodiment of any of the above, a second chamfer is defined between said front and said bottom.

In a further embodiment of any of the above, the top of the seal forms a parallelogram that has an angle to distance ratio of adjoining sides of between 54.3-52.9:1 in degrees per centimeter.

In a further embodiment of any of the above, the first vane mating surface is configured to mate with a first mounting area of a first vane when in a first orientation. The second vane mating surface is configured to mate with a second mounting area of a second vane when in a second orientation inverted relative to the first orientation.

In another exemplary embodiment, a seal for a gas turbine engine includes a top surface, a bottom surface, a first side surface, a second side surface, a back surface and a front surface. The back surface is parallel to the front surface and the first side surface is parallel to the second side surface such that a non-square shape is formed by the intersection of the back surface, the first side surface, the front surface, and the second side surface. A first chamfer is defined between the top surface and the front surface.

In a further embodiment of any of the above, a second chamfer is defined between the front surface and the bottom surface.

In a further embodiment of any of the above, the top of the seal forms a parallelogram having an angle to distance ratio of adjoining sides of between 54.3-52.9:1 in degrees per centimeter.

In a further embodiment of any of the above, the top surface includes a first vane mating surface and the bottom surface includes a second vane mating surface.

BRIEF DESCRIPTION OF THE DRAWINGS

FIG. 2A is a schematic depiction of an inlet vane providing counterclockwise swirl to air entering in the gas turbine engine of FIG. 1.

FIG. 2B is a schematic depiction of an inlet vane providing clockwise swirl to air entering in the gas turbine engine of FIG. 1.

FIG. 3A is a side view of a honeycomb seal of FIG. 1.

FIG. 3B is a top view of the honeycomb seal of FIG. 3A.

FIG. 3C is a cross-sectional view, taken along the lines of 3C-3C of the honeycomb seal of FIG. 3A.

FIG. 4 is a cross-sectional view of a honeycomb seal of FIG. 1.

DETAILED DESCRIPTION OF THE PREFERRED EMBODIMENT

Figure 1:
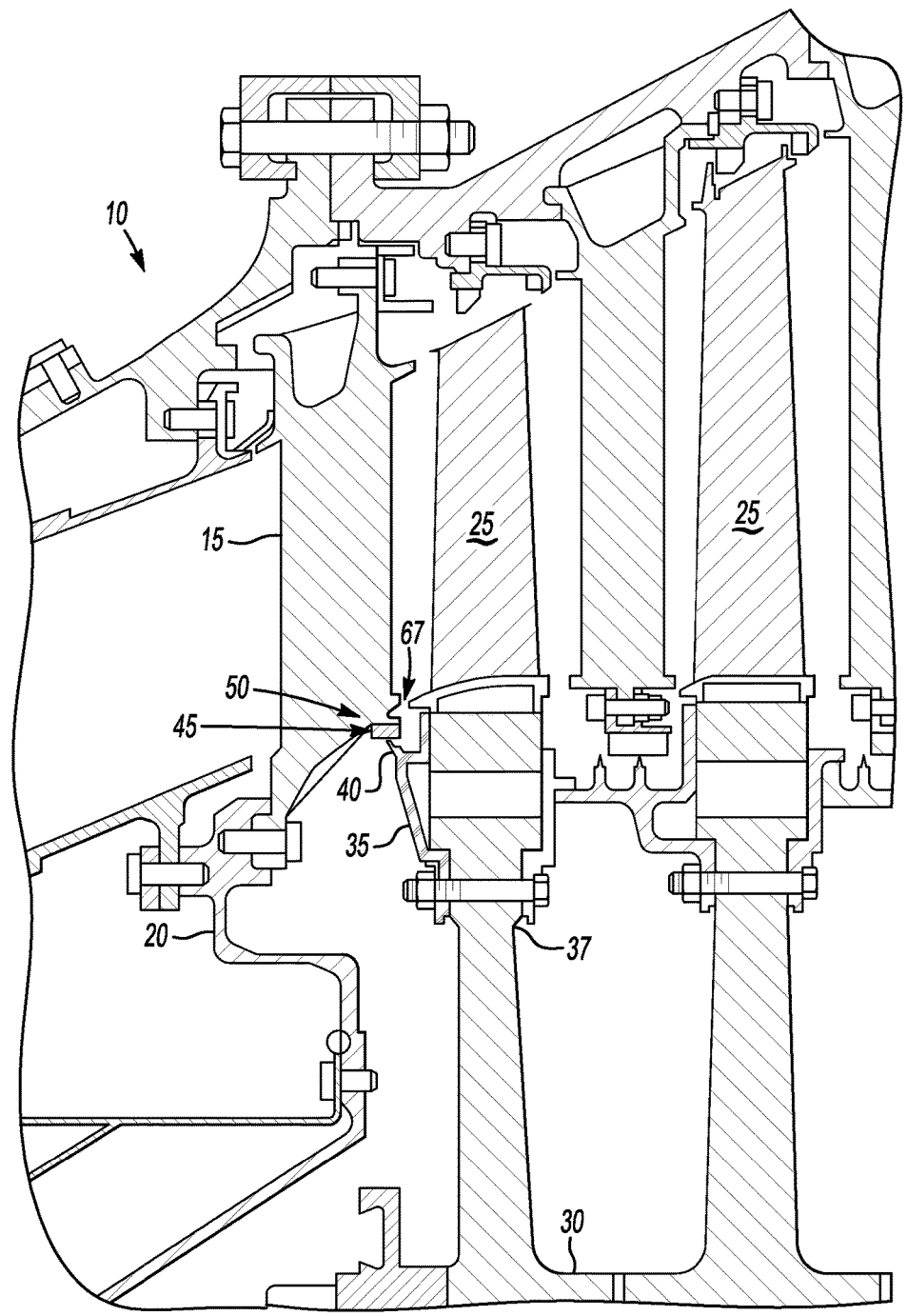
FIG. 1 is a schematic, cutaway depiction of a portion of gas turbine engine.

Referring now to FIG. 1, a cross-section of a portion of a gas turbine engine 10 is shown. Gas turbine engine 10 has an inlet vane 15 fixedly attached to a stationary frame 20. A compressor vane 25, or the like, is attached to a rotating hub 30 by a strut 37. An air seal 35 having a knife edge 40 extending angularly towards the inlet vane 15 is mounted to the strut 37. A seal 45 that interacts with the knife edge 40 attaches to a base 50 of the inlet vane 15. Though the vane 15 is shown as an inlet vane, other airfoils such as blades are contemplated herein. Similarly, though the vane 25 is shown as a compressor vane, other vane types are contemplated herein.

Referring now to FIGS. 2A and 2B, a counterclockwise inlet vane 55 has a first airfoil section 60 that imparts a counterclockwise swirl to air entering the gas turbine engine 10. Similarly, referring to FIG. 2B, a clockwise inlet vane 65 has a second airfoil section 70 which imparts a clockwise swirl to air entering the gas turbine engine 10. In each engine a counterclockwise inlet vane 55 or clockwise inlet vane 65 may be used to impart air swirls to the gas turbine engine 10 as is required by design constraints. The inventors have discovered that creating one seal 45 that fits either a clockwise inlet vane 65 or a counterclockwise inlet vane 55 may minimize costs and time to manufacture an inlet vane 15 that minimizes a loss of air through a gap 67 between the base 50 of the inlet vanes 15 and the vanes 25 (see FIG. 1).

Referring now to FIGS. 2A, 2B, and 4, the base 50 has an attachment area 75 including: a first flange 80 having a horizontal orientation, a left edge 81 and a right edge 82; a second flange 85 having a vertical orientation, a left edge 86 and a right edge 87; the first flange and the second flange being joined by an impediment such as a radius surface 90. The left edge 86 of the second flange and the left edge 81 of the first edge are in plane forming a left face 95; and the right edge 82 of the first flange 80 and the right edge 87 of the second flange 85 are in plane forming a right face 100. The left face 95 and the right face 100 are parallel to each other, and with the first flange 80 and the second flange 85 form a first parallelogram 105 in the base 50 of the counterclockwise inlet vane 55 and a second parallelogram 110 in the base 50 of the clockwise inlet vane 65 as will be discussed infra.

Referring now to FIGS. 3A through 3C, the seal 45 is shown. The seal has a top 115, a bottom 120, a back 125, a front 130, a first chamfer 135 extending from the top 115 to the front 130 and a second chamfer 140 extending from the front 130 to the bottom 120. The seal has a left face 145 and a right face 150. As oriented in FIG. 3B, the honeycomb seal 45 is intended for use in the counterclockwise inlet vane 55 assuming top 115 attaches to the first flange 80 in FIG. 2A. The left face 145 of the seal 45 is in plane with the left face 95 and the right face 150 of the seal is in plane with the right face 100. The first chamfer 135 and the second chamfer 140 are angled at 45° to avoid contact with the radius surface 90 during and after assembly. The seal has a honeycomb sealing surface 151 on the top 115 and the bottom 120 thereof so that the seal may be used with either the counterclockwise inlet vane 55 or the clockwise inlet vane 65.

Figure 5A:
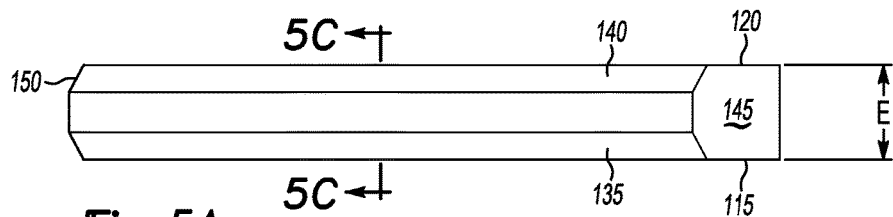
FIG. 5A is a side view of a honeycomb seal of FIG. 1.
Figure 5B:
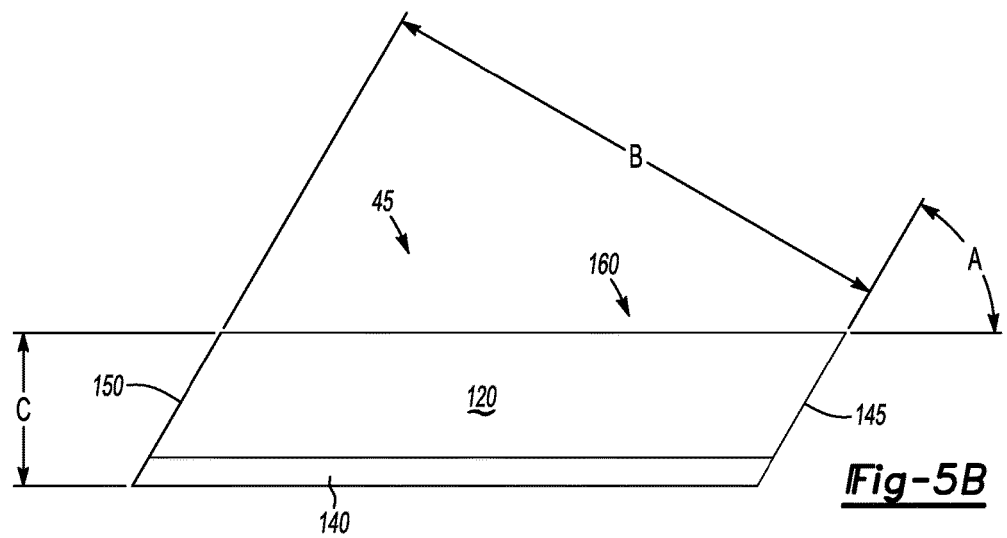
FIG. 5B is a top view of the honeycomb seal of FIG. 5A.
Figure 5C:
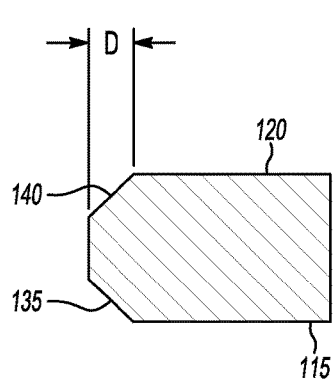
FIG. 5C is a cross-sectional view, taken along the lines of 5C-5C of the honeycomb seal of FIG. 5A.

However, as shown in FIGS. 5A-5C, the seal 45 is shown in orientation for use with the clockwise inlet vane 65 assuming bottom 120 attaches to the first flange 80 in FIG. 2B. Comparing FIGS. 3B and 5B, the orientation of the seal 45 shown in FIG. 5B is inverted from the seal shown in FIG. 3B. That is, the top 115 in 3B is now the bottom 120 in FIG. 5B and the bottom 120 is now the top as shown. Similarly, the left-face 145 is now the right-face, and the right-face 150 is now the left-face. In such a position, the seal 45 may be inserted into the attachment area 75 of the counterclockwise inlet vane 55. For use in the clockwise vane 65, the honeycomb must be inverted and used as shown in FIG. 5B.

As shown in FIG. 3B, a third parallelogram 155 is shown where the back 125 extends to the left over the front 130. Similarly, the seal 45 is shown inverted in FIG. 5 such that a fourth parallelogram is shown where the back of the 125 of the seal 45 extends over the right side of the face-front 130 to form a fourth parallelogram 160. In the inlet vane 55, the seal 45 fits within the attachment area 75 such that the first parallelogram 105 mates with the third parallelogram 155 of the seal 45. And if the inlet vane 65 is used, the second parallelogram 110 mates with the fourth parallelogram 160. All of the first, second, third and fourth parallelograms 105, 110, 155, 160 are not square. The seal 45 is brazed to the first flange 80 and the second flange 85 and the chamfered areas 135 and 145 avoid the radius surface 90 whether in a clockwise inlet vane 65 or a counterclockwise inlet vane 55.

The angle α of the parallelograms between the back face and the front face in both instances is 60 degrees +/−0.25 degrees. The distance B between each parallelogram is 1.11 to 1.13 inches or 2.82 to 2.87 cm. The distance between the front 130 and the back 125 is between 0.315 and 0.335 inches or 0.80 cm and 0.85 cm and the thickness of the honeycomb seal 45 is between 0.195 and 0.205 inches or between 0.49 and 0.52 cm. The ratio between the angle α and the distance B is therefore α/B or 54.3-52.9:1 in degrees per centimeter.

Figure 6:
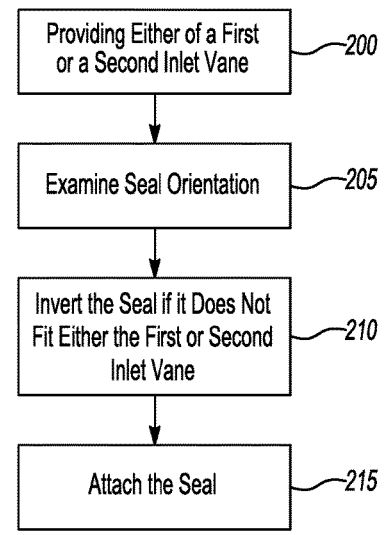
FIG. 6 is a block diagram of a method of using the seal of FIG. 1.

Referring now to FIG. 6, a user is provided with either of an inlet vane 55 imparting a first twist (e.g., counterclockwise) of air passing thereby or a second inlet vane 65 imparting a second, different twist (e.g., clockwise) of air passing thereby (step 200). The user then examines the orientation of the seal 45 (step 205) and then inverts the seal to fit either of the inlet vane 55 or the inlet vane 65 if the seal does not fit the inlet vane 55 or the inlet vane 65 after first examining the seal (step 210). The user then attaches the seal to the provided inlet vane 55 or 65.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments. For instance, while a seal 45 with a honeycomb is shown herein, other seals are contemplated for use herewith if the seal is two-sided and approximates the shape of the attachment area 75.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A seal for a gas turbine engine comprising:
    a top;
    a bottom;
    a left side;
    a right side;
    a back;
    a front, wherein said back is parallel to said front and said left side is parallel to said right side such that a non-square shape is formed by the intersection of the back, the left side, the front and the right side, and said top includes a first vane mating surface and said bottom includes a second vane mating surface, and said top of said seal includes a first honeycomb sealing surface for engaging a first knife edge and the bottom of said seal includes a second honeycomb sealing surface for engaging a second knife edge seal;
    a first chamfer defined between said top and said front; and
    a second chamfer defined between said front and said bottom.

2. The seal of claim 1 wherein said top of said seal forms a parallelogram having an angle to distance ratio of adjoining sides of between 54.3-52.9:1 in degrees per centimeter.

3. The seal of claim 1, wherein said front of said seal includes a flange contact surface.

4. The seal of claim 1, wherein said seal is symmetric about a plane parallel to said top and said bottom.

5. A seal for a gas turbine engine comprising:
    a top surface;
    a bottom surface;
    a first side surface;
    a second side surface;
    a back surface, and
    a front surface, wherein said back surface is parallel to said front surface and said first side surface is parallel to said second side surface such that a non-square shape is formed by the intersection of the back surface, the first side surface, the front surface, the second side surface and a first chamfer defined between said top surface and said front surface, and said top surface of said seal includes a first honeycomb sealing surface for engaging a first knife edge and the bottom surface of said seal includes a second honeycomb sealing surface for engaging a second knife edge seal.

6. The seal of claim 5 further comprising a second chamfer defined between said front surface and said bottom surface.

7. The seal of claim 6 wherein said top surface of said seal forms a parallelogram having an angle to distance ratio of adjoining sides of between 54.3-52.9:1 in degrees per centimeter.

8. The seal of claim 5, wherein said top surface includes a first vane mating surface and said bottom surface includes a second vane mating surface.

9. The seal of claim 5, wherein said front surface of said seal includes a flange contact surface.

10. The seal of claim 5, wherein said seal is symmetric about a plane parallel to said top surface and said bottom surface.

* * * * *